(12) United States Patent
Nakagawa

(10) Patent No.: US 11,393,116 B2
(45) Date of Patent: Jul. 19, 2022

(54) INFORMATION PROCESSING APPARATUS, METHOD THEREOF, AND NON-TRANSITORY COMPUTER-READABLE STORAGE MEDIUM

(71) Applicant: CANON KABUSHIKI KAISHA, Tokyo (JP)

(72) Inventor: Masashi Nakagawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 179 days.

(21) Appl. No.: 16/552,028

(22) Filed: Aug. 27, 2019

(65) Prior Publication Data
US 2020/0074659 A1 Mar. 5, 2020

(30) Foreign Application Priority Data

Aug. 31, 2018 (JP) .............................. JP2018-163624

(51) Int. Cl.
G06T 7/564 (2017.01)
G06N 20/00 (2019.01)
G06K 9/46 (2006.01)

(52) U.S. Cl.
CPC ............ G06T 7/564 (2017.01); G06K 9/4609 (2013.01); G06N 20/00 (2019.01); G06T 2207/20081 (2013.01)

(58) Field of Classification Search
CPC .......... G06T 7/564; G06T 2207/20081; G06N 20/00; G06K 9/4609; G06K 9/036; G06K 9/50; G06K 9/48; G06K 9/6204; G06K 9/4604
See application file for complete search history.

(56) References Cited

U.S. PATENT DOCUMENTS

| 2,866,899 A | * | 12/1958 | Busignies | G01J 3/28 |
| | | | | 250/338.1 |
| 2,920,306 A | * | 1/1960 | Wischmeyer | G01V 1/366 |
| | | | | 367/40 |
| 4,154,788 A | * | 5/1979 | Hockensmith | H01Q 15/22 |
| | | | | 264/129 |

(Continued)

FOREIGN PATENT DOCUMENTS

| CN | 107808390 A | * | 3/2018 | ........... G05D 1/0238 |
| JP | 2013134706 A | | 7/2013 | |

(Continued)

*Primary Examiner* — Charles T Shedrick
(74) *Attorney, Agent, or Firm* — Carter, DeLuca & Farrell LLP

(57) ABSTRACT

This invention provides an information processing apparatus which comprises an image acquiring unit configured to acquire images captured by a plurality of image capturing devices, a contour extracting unit configured to extract a contour of an object from the image acquired by the image capturing device, a matching unit configured to match corresponding points on the contours between the images, a depth calculating unit configured to calculate a depth of the matched point, a reliability extracting unit configured to acquire a reliability of the depth based on an angle formed by an epipolar line and a tangential direction of the contour, and a depth correcting unit configured to correct the depth based on the depth and the reliability.

9 Claims, 11 Drawing Sheets

(56) References Cited

U.S. PATENT DOCUMENTS

| | | | | |
|---|---|---|---|---|
| 4,155,098 A | * | 5/1979 | Roach | G11B 23/0057 250/550 |
| 4,210,968 A | * | 7/1980 | Lindseth | G01V 1/303 367/46 |
| 5,684,890 A | * | 11/1997 | Miyashita | G06T 7/70 382/154 |
| 6,718,062 B1 | * | 4/2004 | Zhang | G06K 9/32 382/154 |
| 9,674,504 B1 | * | 6/2017 | Salvagnini | G01S 7/4972 |
| 10,572,760 B1 | * | 2/2020 | Wu | G06K 9/3258 |
| 10,937,178 B1 | * | 3/2021 | Srinivasan | G06T 7/70 |
| 2010/0014781 A1 | * | 1/2010 | Liu | H04N 13/261 382/285 |
| 2012/0229833 A1 | | 9/2012 | Nakagawa | |
| 2013/0100254 A1 | * | 4/2013 | Morioka | H04N 13/25 348/47 |
| 2013/0163883 A1 | * | 6/2013 | Takemoto | G06K 9/50 382/199 |
| 2013/0287292 A1 | * | 10/2013 | Ono | G06K 9/00201 382/154 |
| 2013/0342641 A1 | * | 12/2013 | Morioka | G03B 35/08 348/36 |
| 2019/0122378 A1 | * | 4/2019 | Aswin | G06T 5/003 |
| 2019/0197659 A1 | * | 6/2019 | Kubota | G06T 1/60 |
| 2019/0200041 A1 | * | 6/2019 | Kubota | G06T 7/593 |
| 2019/0311214 A1 | * | 10/2019 | Lakemond | G06K 9/4671 |
| 2020/0005489 A1 | * | 1/2020 | Kroeger | G06K 9/4604 |
| 2021/0090279 A1 | * | 3/2021 | Dekel | G06T 7/579 |

FOREIGN PATENT DOCUMENTS

| | | | | |
|---|---|---|---|---|
| JP | | 2013185905 A | 9/2013 | |
| JP | | 2015082288 A | 4/2015 | |
| WO | | WO-2019018065 A1 | * 1/2019 | G06K 9/00208 |
| WO | | WO-2020221443 A1 | * 11/2020 | G06T 7/55 |

\* cited by examiner

INFORMATION PROCESSING APPARATUS, METHOD THEREOF, AND NON-TRANSITORY COMPUTER-READABLE STORAGE MEDIUM

BACKGROUND OF THE INVENTION

Field of the Invention

The present invention relates to a technique for acquiring depth information from images acquired by a plurality of cameras.

Description of the Related Art

In recent years, research related to mixed reality which presents, to a user, information of a virtual space in a physical space by overlaying the information of the virtual space onto the physical space in real time is being conducted. An image processing apparatus used in mixed reality generates a synthetic image by superimposing a part of or the entire physical space image captured by an image capturing device, such as a video camera, to a virtual space image (CG) generated in accordance with the position and orientation of the image capturing device. The virtual space image can be synthesized with a physical object by estimating the three-dimensional shape of the object by detecting a specific object region from the physical space image at this time. As a representative method of estimating the three-dimensional space, there is a stereo measurement method that uses a plurality of cameras. In the stereo measurement method, camera parameters such as the focal length, the orientation and position between cameras, and the like are estimated by calibrating the image capturing devices, and the depth is estimated by the principle of triangulation based on the camera parameters and the corresponding points of the captured images.

However, the stereo measurement method is problematic in that the correct three-dimensional position and depth cannot be estimated in a location with few features because it is difficult to detect corresponding points in such a location. In consideration of this problem, there is proposed a method for improving depth estimation in stereo measurement. For example, in Japanese Patent Laid-Open No. 2013-185905 (to be referred to as literature 1 hereinafter), the depth information acquired by stereo measurement is improved by improving the accuracy of the corresponding points of the captured images by using density changes in texture, a line extending toward a vanishing point, and the like as pieces of key information.

In Japanese Patent Laid-Open Nos. 2013-134706 (to be referred to as literature 2 hereinafter) and 2015-82288 (to be referred to as literature 3 hereinafter), depth measurement can be performed on an object which has few features by matching points on a contour line as corresponding points when the object which has few features is to be detected. Also, in literature 3, the depth of the object is estimated accurately by performing correction by plane approximation. In addition to these methods, there is also a method in which left and right captured images are matched by projecting an infrared light pattern to apply features to an object.

However, in a case in which the relative position and orientation between the image capturing devices has shifted due to small errors caused by aging of the devices or calibration, changes caused by a temperature rise, or the like, the correct depth cannot be acquired because the matches made between left and right images will also shift. In addition, a case in which intersections of the contour and the epipolar line are matched between the plurality of image capturing devices, as disclosed in literatures 2 and 3, poses a problem in that a large depth error can be generated depending on the shape of the contour.

SUMMARY OF THE INVENTION

The present invention has been made in consideration of the above problem and provides a technique that can estimate a correct depth by acquiring the reliability of a corresponding point and performing estimation based on the reliability even in a case in which a physical shift is generated between image capturing devices after the calibration of the image capturing devices.

According to an aspect of the invention, there is provided an information processing apparatus comprising: an image acquiring unit configured to acquire images captured by a plurality of image capturing devices; a contour extracting unit configured to extract a contour of an object from the image acquired by the image capturing device; a matching unit configured to match corresponding points on the contours between the images; a depth calculating unit configured to calculate a depth of the matched point; a reliability extracting unit configured to acquire a reliability of the depth based on an angle formed by an epipolar line and a tangential direction of the contour; and a depth correcting unit configured to correct the depth based on the depth and the reliability.

According to the present invention, even in a case in which a positional shift has occurred between a plurality of image capturing devices due to some cause, it is possible to suppress the calculation of a wrong depth.

Further features of the present invention will become apparent from the following description of exemplary embodiments (with reference to the attached drawings).

DESCRIPTION OF THE EMBODIMENTS

Figure 1:
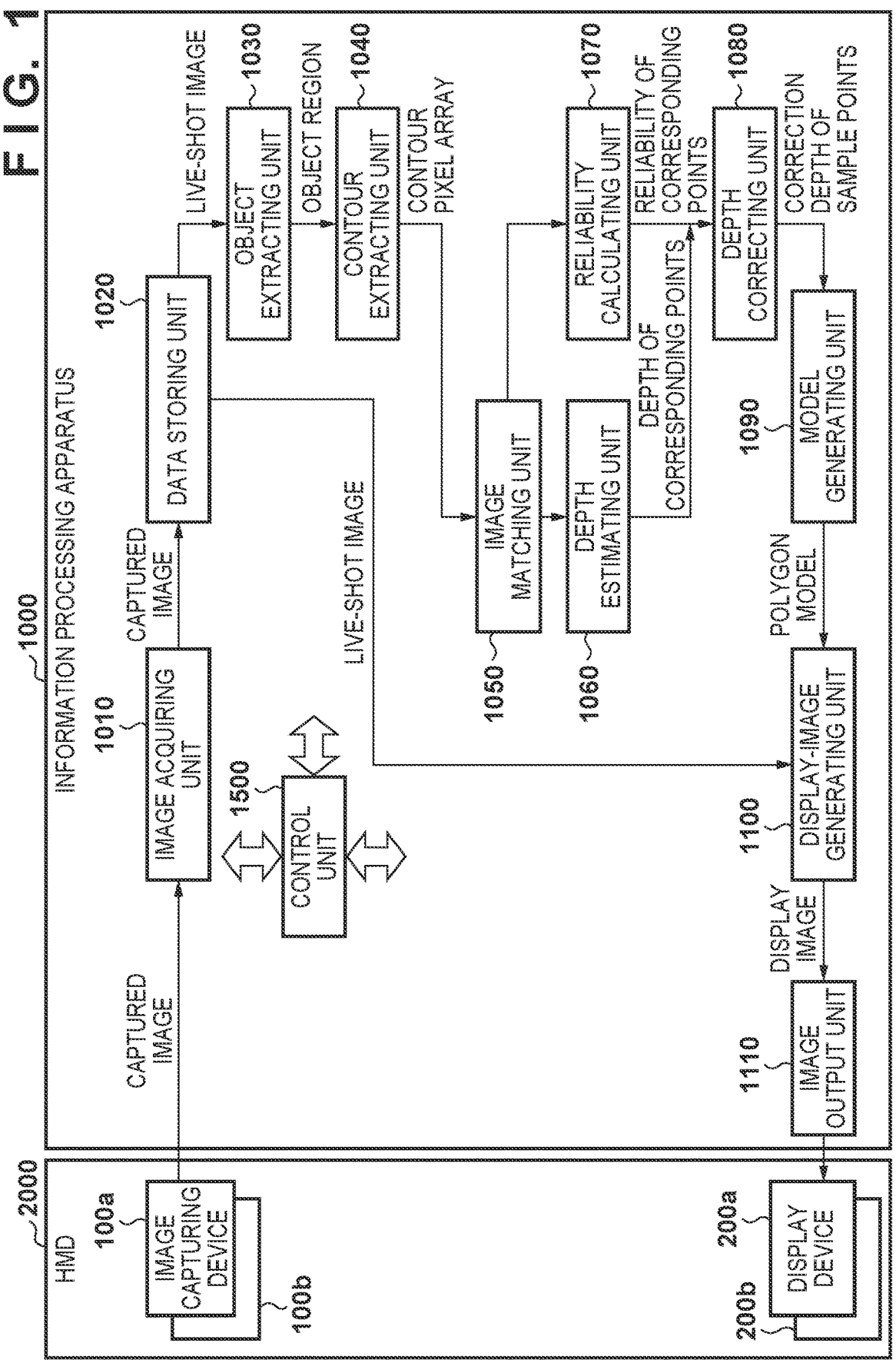
FIG. 1 is a block diagram of an information processing apparatus according to an embodiment.

An embodiment according to the present invention will be described in detail hereinafter with reference to the accompanying drawings. Note that the arrangement of the embodiment to be shown below is merely an example, and the present invention is not limited to the arrangement shown in the drawings.

Figure 2:
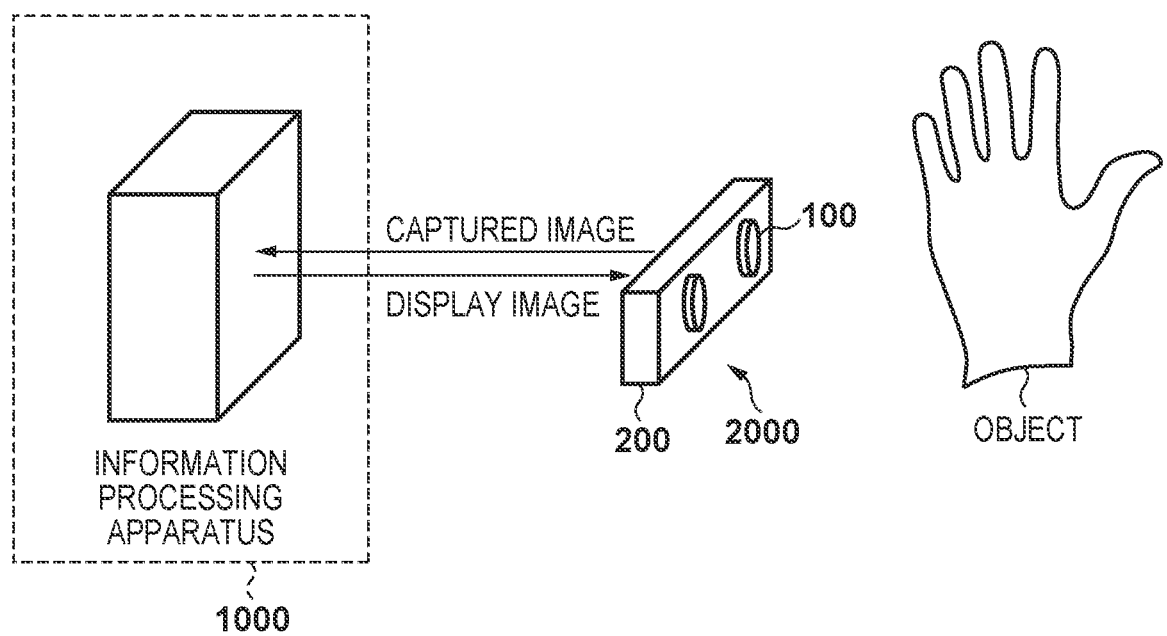
FIG. 2 is a view showing a usage mode of the information processing apparatus according to the embodiment.

FIG. 1 is mainly a block diagram of an information processing apparatus, and FIG. 2 shows a usage mode of the information processing apparatus.

An HMD 2000 which is formed by integrating two image capturing devices 100a and 100b and two display devices 200a and 200b is connected to an information processing apparatus 1000 according to the embodiment. Stereoscopic imaging can be performed by the two image capturing devices 100a and 100b. Also, although the two display devices 200a and 200b correspond to the left eye and the right eye, respectively, of an operator, a single display screen may be divided into a left region and a right region, and each of these regions may display a corresponding one of an image corresponding to the left eye and an image corresponding to the right eye. Note that the image capturing devices 100a and 100b are synchronized and perform image capturing at, for example, 30 fps. In addition, the HMD 2000 and the information processing apparatus 1000.

The information processing apparatus 1000 includes an image acquiring unit 1010, a data storing unit 1020, an object extracting unit 1030, a contour extracting unit 1040, an image matching unit 1050, depth estimating unit 1060, a reliability calculating unit 1070, a depth correcting unit 1080, a model generating unit 1090, a display-image generating unit 1100, and an image outputting unit 1110. The information processing apparatus 1000 also includes a control unit 1500 that controls these components such as the image acquiring unit 1010 and the like. The control unit 1500 is formed by a CPU, a ROM that stores and holds programs and parameters to be executed by the CPU, a RAM to be used as a work area of the CPU, and the like. Note that a component such as the object extracting unit 1030 that is formed mainly from processing contents may be implemented by software which is executed by the control unit 1500.

The image acquiring unit 1010 acquires images captured by the image capturing devices 100a and 100b, and supplies the acquired captured images to the data storing unit 1020. The data storing unit 1020 stores the captured images supplied from the image acquiring unit 1010. Note that the data storing unit 1020 also stores data of a virtual object and pieces of information such as color and shape recognition information used for object extraction and the like.

The object extracting unit 1030 extracts a specific object region from each of the two captured images. For example, the color of an object is registered in advance to extract a registered color region from each captured image. The contour extracting unit 1040 extracts a contour from each object region extracted by the object extracting unit 1030. Note that the arrangement order of the contour will also be acquired. For example, contour tracking is performed on each object region to acquire a contour position and contour information.

Figure 3:
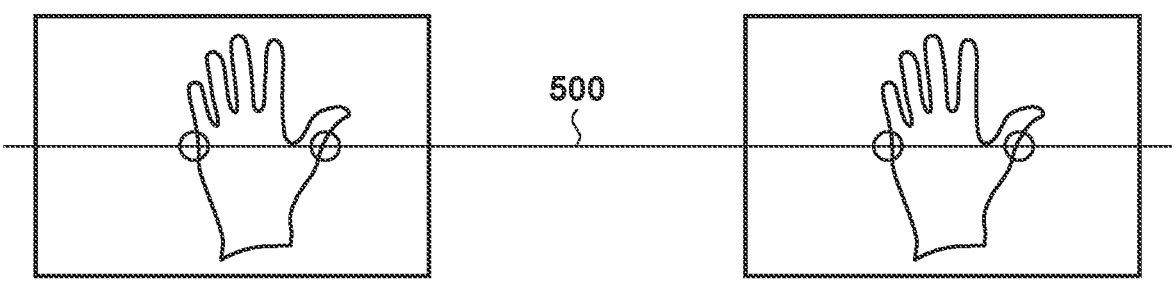
FIG. 3 is a view for explaining corresponding points.

The image matching unit 1050 detects each corresponding point between the two captured images by using the contour information acquired by the contour extracting unit 1040. For example, as shown in FIG. 3, intersections between the contour and an epipolar line 500 are acquired in each captured image, and each set of intersections that matches between the captured images is set as a corresponding point.

The depth estimating unit 1060 estimates the three-dimensional position of each corresponding point by using the points matched by the image matching unit 1050. For example, the three-dimensional position of each corresponding point can be calculated based on the principle of triangulation by calculating the camera parameters (the principal points, focal lengths, and the relative position and orientation between the two image capturing devices) of the image capturing devices 100a and 100b in advance.

The reliability of each intersection of the contour and the epipolar line in the image matching unit 1050 is calculated by the reliability calculating unit 1070 based on an angle formed by a tangential direction of the intersection on the contour and a direction indicated by the epipolar line (to be described in detail later). The depth correcting unit 1080 corrects the three-dimensional position (depth) based on the depth acquired by the depth estimating unit 1060 and the reliability acquired by the reliability calculating unit 1070. The model generating unit 1090 generates a three-dimensional model of the object by using the contour information and the three-dimensional position of each corresponding point corrected by the depth correcting unit 1080.

The display-image generating unit 1100 generates two left and right display images by synthesizing each captured image stored in the data storing unit 1020, the data of the virtual object, and the model generated by the model generating unit 1090. The display-image generating unit 1100 outputs each generated display image to the corresponding one of the display devices 200a and 200b via the image outputting unit 1110, and causes each display device to display the image.

Figure 4:
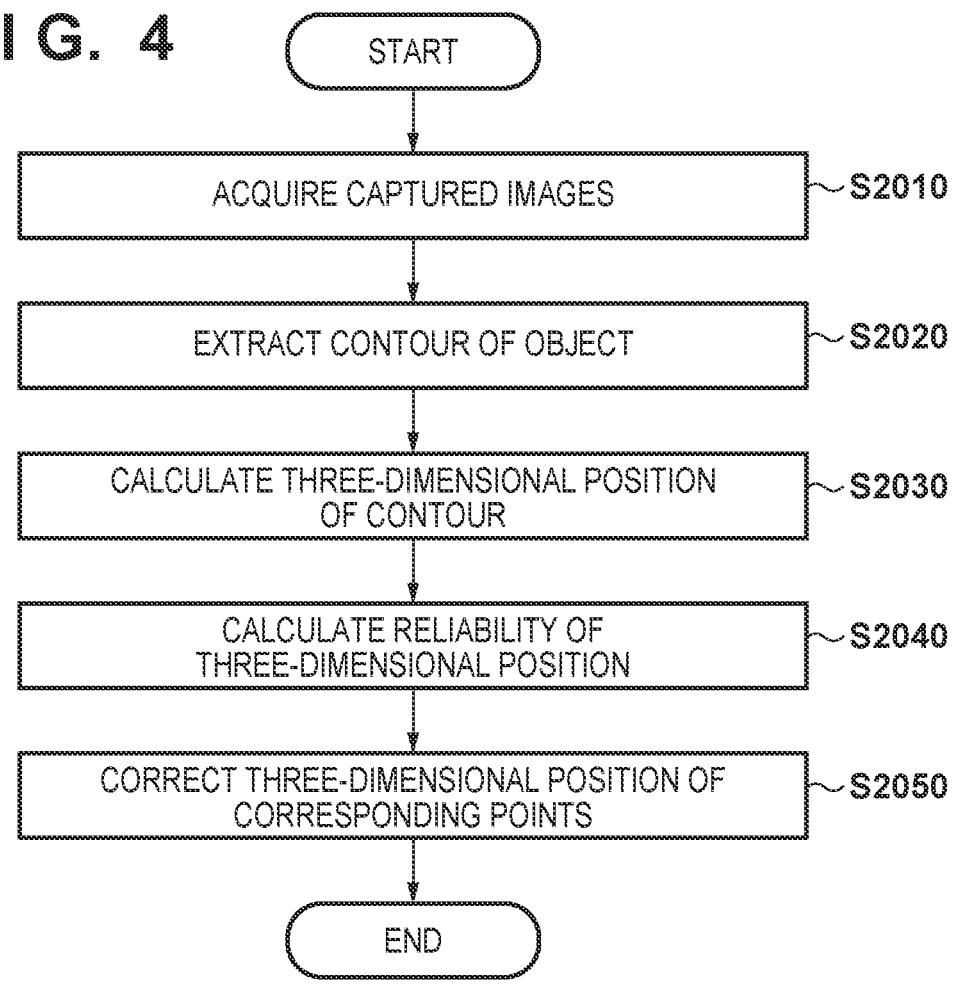
FIG. 4 is a flowchart showing position correction processing of the corresponding point according to the embodiment.

The components of the information processing apparatus according to the embodiment have been described above. The processing contents of the information processing apparatus 1000 according to this embodiment will be described next in accordance with the flowchart of FIG. 4. Note that the program related to the processing of FIG. 4 is stored in the ROM in the control unit 1500.

In step S2010, the control unit 1500 acquires, via the image acquiring unit 1010, images captured by the image capturing devices 100a and 100b and stores the acquired images in the data storing unit 1020. For example, the image acquiring unit 1010 is a video capture card for acquiring images captured by the image capturing devices 100a and 100b.

In step S2020, the control unit 1500 controls the object extracting unit 1030 and the contour extracting unit 1040 to extract an object region from each of (the two left and right) captured images acquired by the image acquiring unit 1010. Although the extraction method is not particularly limited, for example, the object extracting unit 1030 may extract the object by learning the features of the object in advance by machine learning or may extract the object by registering the color of the object. The contour extracting unit 1040 may extract the contour of the object by executing contour tracking on each extracted object region.

In step S2030, the control unit 1500 controls the image matching unit 1050 and the depth estimating unit 1060 to calculate the intersections of the epipolar lines and the contour and match each set of intersections between the captured images. More specifically, the image matching unit 1050 acquires each intersection of the epipolar line and the contour in each captured image as shown in FIG. 3 and matches the intersections between the captured images. Next, the depth estimating unit 1060 calculates the three-dimensional position of each intersection by executing stereo measurement based on the corresponding points and the camera parameters (the principal points, the focal lengths, and the in-between relative position and orientation) of the image capturing devices 100a and 100b.

In step S2040, the control unit 1500 controls the reliability calculating unit 1070 to calculate the reliability of each three-dimensional position acquired in step S2030. The reliability indicates the degree of influence of an error in the depth when an error occurs in the relative position and orientation between the image capturing devices 100a and 100b.

Figure 5:
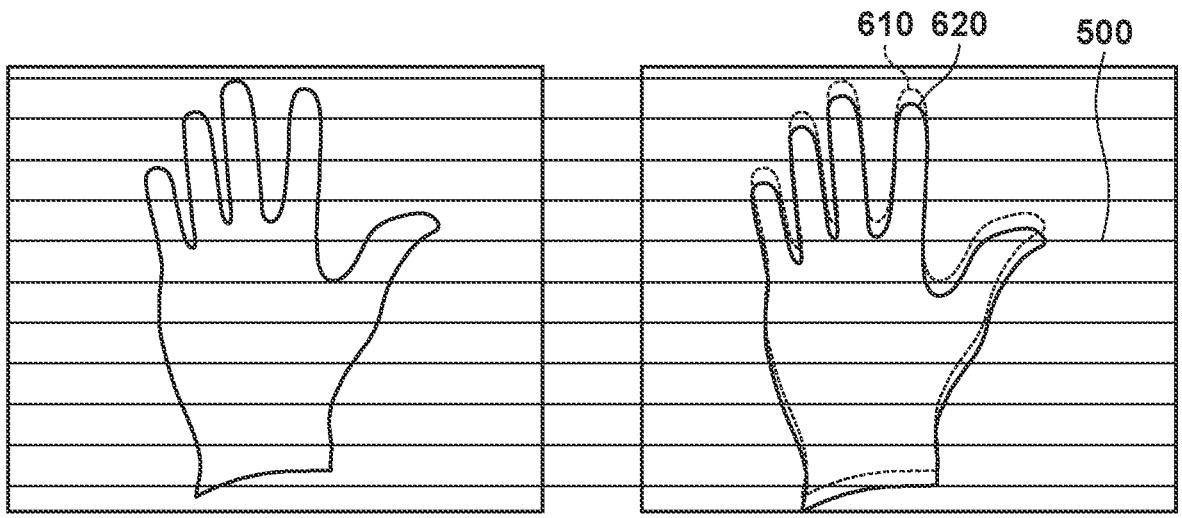
FIG. 5 is a view showing the positional change of the contour of an object when there is a change in a relative position between image capturing devices.

For example, when the two image capturing devices 100a and 100b are calibrated and undergo stereo rectification in the manner as shown in FIG. 5, the epipolar lines 500 become parallel between the two images. However, if the relative position and orientation between the image capturing devices 100a and 100b move after the calibration due to the influence of the aging of the devices or changes in the temperature, the position of the object on one of the images may change from a contour 610 to a contour 620 of FIG. 5 although the calculated parameters (the position of the epipolar lines) acquired from the stereo measurement may not have changed.

Figure 6:
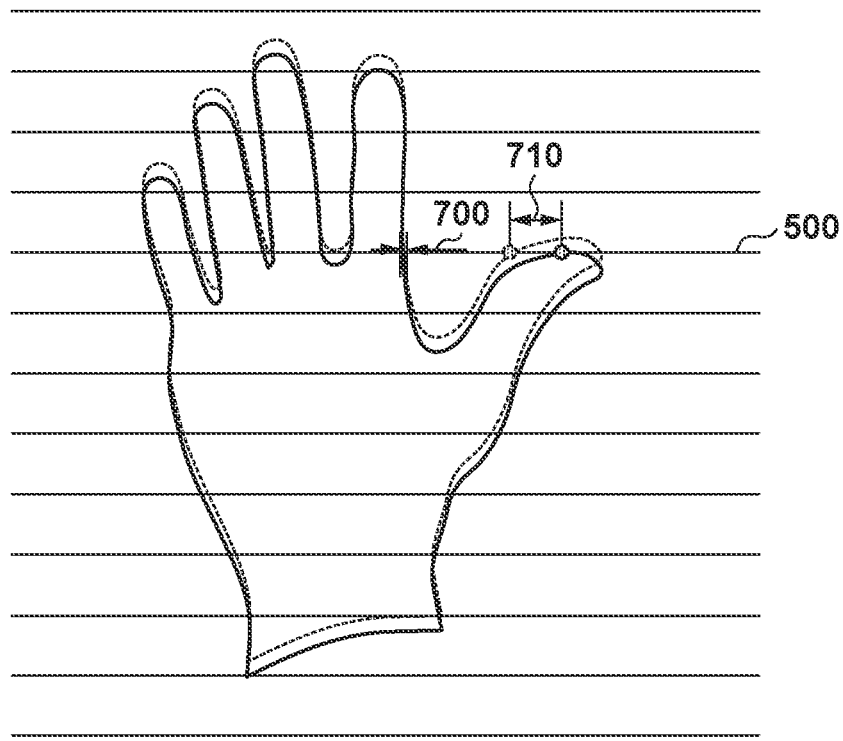
FIG. 6 is a view for explaining how an error changes depending on the position on the contour of the object.

As a result, the intersections of the epipolar lines and the contour shift as shown in FIG. 6. In this case, when an angle which is at the intersection of the epipolar line and the contour and formed by the epipolar line and the tangential direction of the contour line is perpendicular, a shift 700 from the original detected position is small. However, in a case in which the angle formed by the epipolar line and the tangential direction of the contour line at the intersection is small, in other words, in a case in which the tangential direction of the contour line at the intersection is nearly parallel to the epipolar line, the length of a shift 710 from the detected point increases. That is, although the depth error at the position of the shift 700 is small, but it will increase the depth error of the shift 710. In this manner, the size of the angle formed by the epipolar line and the tangential direction of the contour influences the depth error. Therefore, in this embodiment, the reliability will be defined from the angle which is at the intersection of the epipolar line and the contour and formed by the epipolar line and the tangential direction of the contour.

Assume that reliability r will be expressed in a range of real numbers from 0 to 1. Letting θ be an angle formed by the epipolar line and the tangential direction of the contour at an intersection, the reliability r can be expressed as $$r = 1 - |\cos \theta| \quad (1)$$

Wherein the reliability increases as r gets closer to "1", and the reliability decreases as r gets closer to "0".

The accuracy of the corresponding point may also be added to the reliability. For example, the accuracy of the match is higher when the angle formed by the epipolar line and the tangential direction of the contour of the image capturing device 100a and that of the image capturing device 100b match with respect to a given corresponding point. Hence, letting φ be the difference of these angles, the reliability r can be expressed as $$r = (1 - |\cos \theta|) \cdot \cos \varphi \quad (2)$$

Otherwise, a corresponding accuracy may be acquired from the difference between the pixel values of the corresponding points of the two captured images, and the acquired accuracy may be applied to the reliability.

In step S2050, the control unit 1500 controls the depth correcting unit 1080 to correct the depth of the contour acquired in step S2030 based on the reliability acquired in step S2040.

Contour depth correction processing will be described in more detail next.

Figure 7:
FIG. 7 is a view showing a state in which the object is to be stereoscopically measured.
Figure 8:
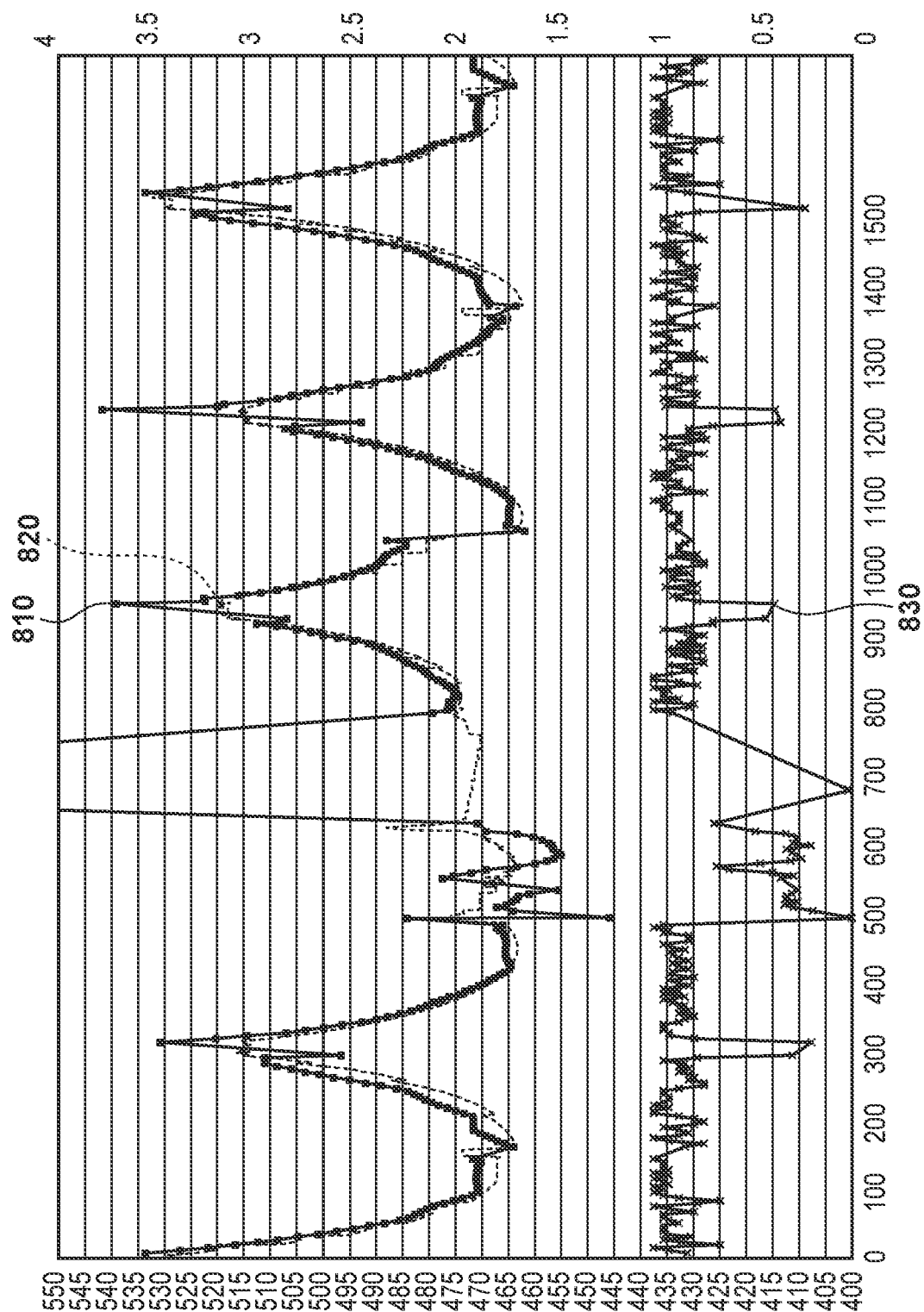
FIG. 8 is a graph showing the relationship between reliability and a depth relationship between a case in which a corresponding point of the contour has shifted and a case in which the corresponding point of the contour has not shifted.

In a case in which the depth of the object shown in FIG. 7 is to be stereoscopically measured, the depth along the contour will change in a continuous manner as shown in FIG. 8. In FIG. 8, note that the left-end ordinate indicates the depth, and the abscissa has a preset position on the contour as the starting point and indicates a position on the contour line extending, for example, counterclockwise from the starting point. The right-end ordinate represents the reliability. Since the reliability falls within the range of 0 to 1 in this embodiment, assume that any value exceeding "1" as shown in FIG. 7 is shown as a matter of descriptive convenience.

In this case, reference numeral 810 indicates a depth stereoscopically measured in a state in which a corresponding point has shifted and reference numeral 820 indicates an actual depth. Also, reference numeral 830 indicates the reliability and is distributed so as to fall in a value range of 0 to 1 as shown in FIG. 8.

As shown in FIG. 8, there is a difference between the stereoscopically measured depth 810 and the actual depth 820 depending on the location on the contour, and it can be seen that a large depth error has been generated at the corresponding point of a case in which the reliability 830 is low. In addition, it can be seen that the difference between the stereoscopically measured depth 810 and the actual depth 820 is small at a location where the reliability 830 is high.

As described above, in this embodiment, depth correction is performed so as to hold (maintain) the depth of a corresponding point which has high reliability. More specifically, the changes in the depth along the contour is made into a function and approximated to an arbitrary function by the least-squares method. Letting $d_i$ be a stereoscopically measured depth of a corresponding point i, f(i) be a depth of the approximation function, $r_i$ be a reliability, an error function of the least-squares method can be defined by $$E = \Sigma (d_i - f(i)) \times r_i \quad (3)$$

Figure 9:
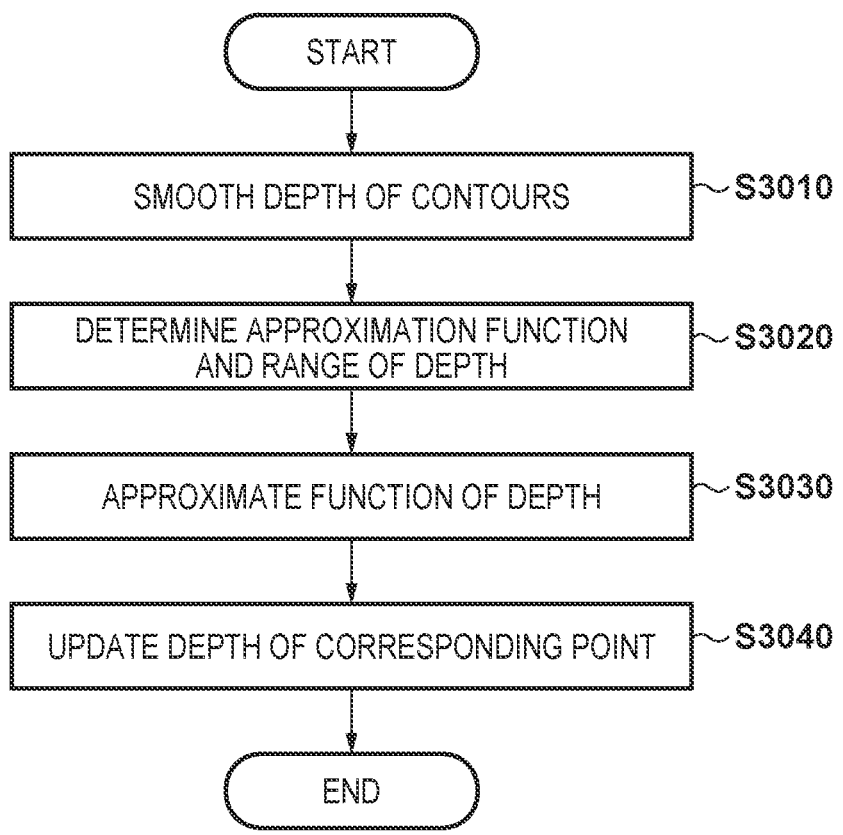
FIG. 9 is a flowchart showing depth correction processing according to the embodiment.

The correction processing performed by the depth correcting unit 1080 according to the embodiment will be described with reference to the flowchart of FIG. 9.

Figure 10:
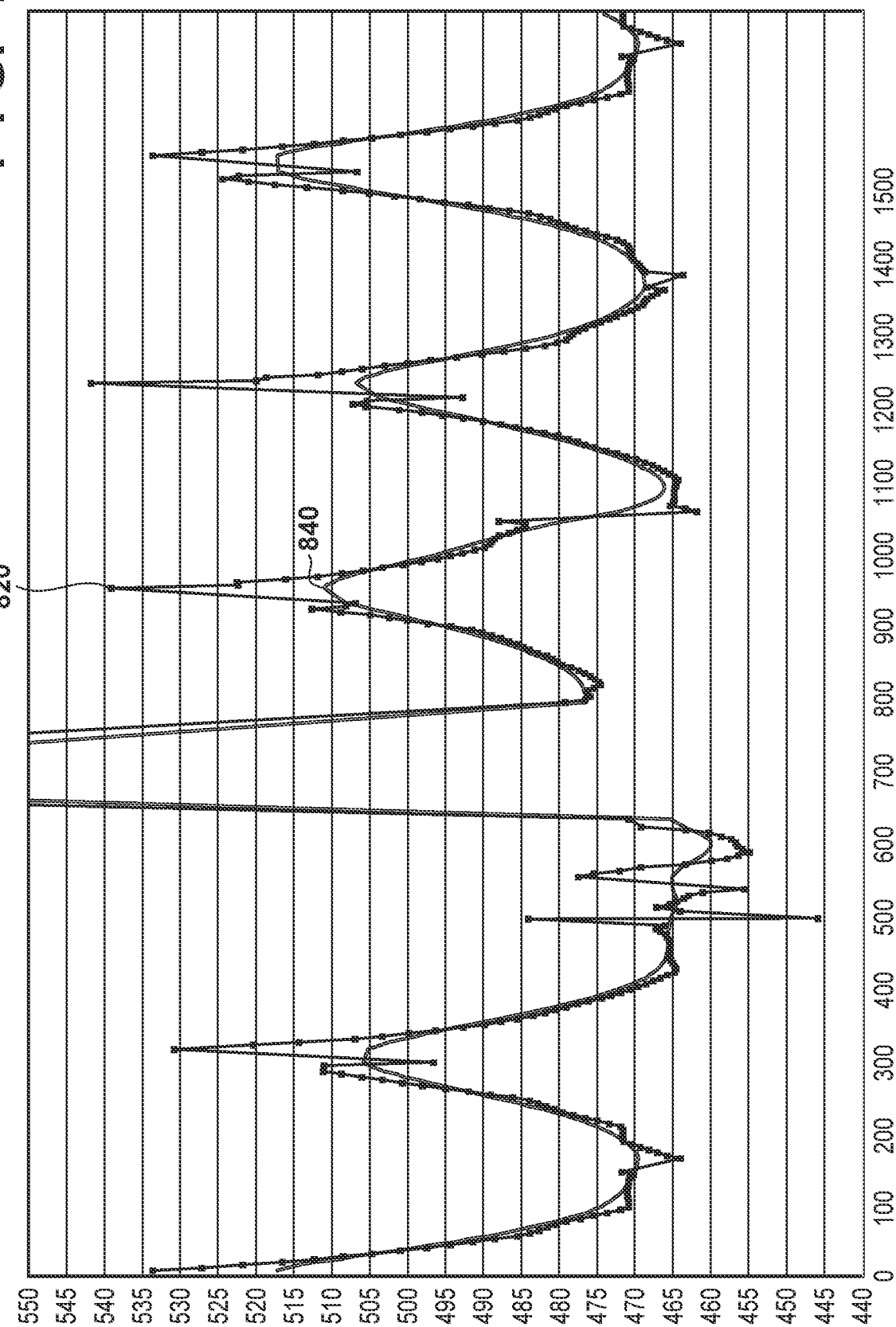
FIG. 10 is a graph for explaining a low-pass filter which is applied to the depth.

In step S3010, the depth correcting unit 1080 acquires a smoothing function 840 by applying a low-pass filter to a depth change function as shown in FIG. 10. Also, in step S3020, the depth correcting unit 1080 estimates the order or the approximation range of the approximation function from the function acquired after applying the low-pass filter. At this time, the approximation function and the approximation range may be represented by overlaying a plurality of functions. For example, the depth change of positions 0 to 300 on the contour may be approximated by a quadratic function, and the depth change of contour positions 300 to 700 may be approximated by a quartic function.

In step S3030, the depth correcting unit 1080 approximates the stereoscopically measured depth function by using a quadratic function, a quartic function, a linear function, or the like. If the approximation function error is large, the approximation function may be changed and recalculated or may be corrected by the depth of the low-pass filter.

Figure 11:
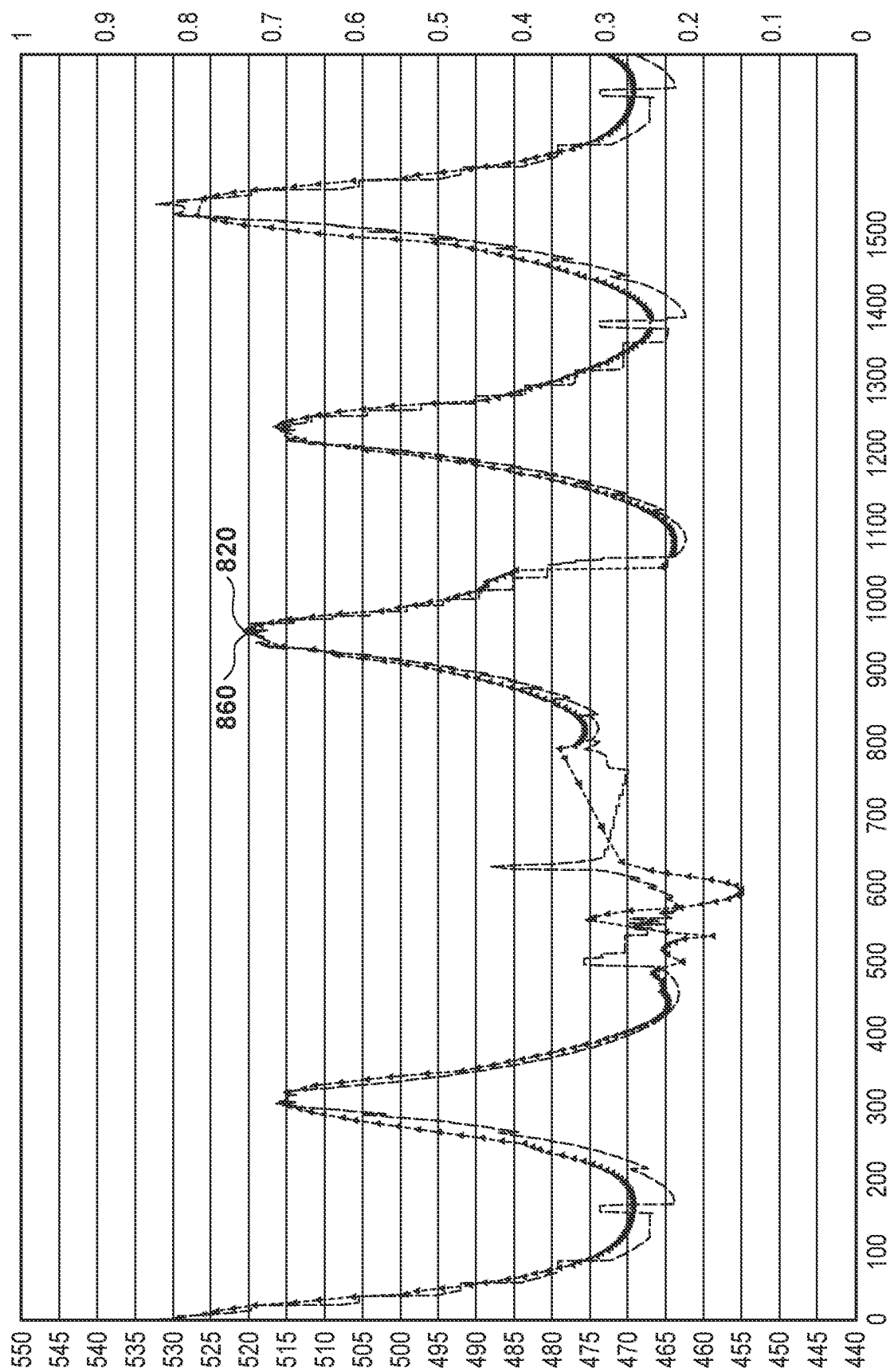
FIG. 11 is a graph showing the relationship between a corrected depth and an actual depth.

Next, in step S3040, the depth correcting unit 1080 calculates the new depth of the corresponding point by the approximation function acquired in step S3030. Note that in a case in which a plurality of approximation functions are overlayed, averaging is performed on the depths of the plurality of approximation functions with respect to one corresponding point in consideration of the continuity of the depth. FIG. 11 shows the relationship between the actual depth 820 and a depth 860 taken along the contour after the correction. Also, in a case in which the difference of the corrected depth is large for each image capturing device, it may be removed as noise.

According to the processing described above, even in a case in which the relative position and orientation between the image capturing devices have changed due to the aging of the devices and changes in the temperature after the calibration of the image capturing devices, it is possible to accurately estimate the depth by stereo measurement, and the object can be synthesized with the virtual space without incongruity in mixed reality.

[First Modification]

Although the above embodiment described a method of approximating the change function of a depth along a contour by n-th order function as the depth correction method, a more complex function may be used for the approximation. More specifically, the changes in the depth may be learned by using machine learning for the depth function along the contour in advance, and the depth may be corrected based on the depth and the reliability by using the machine learning result.

Figure 12:
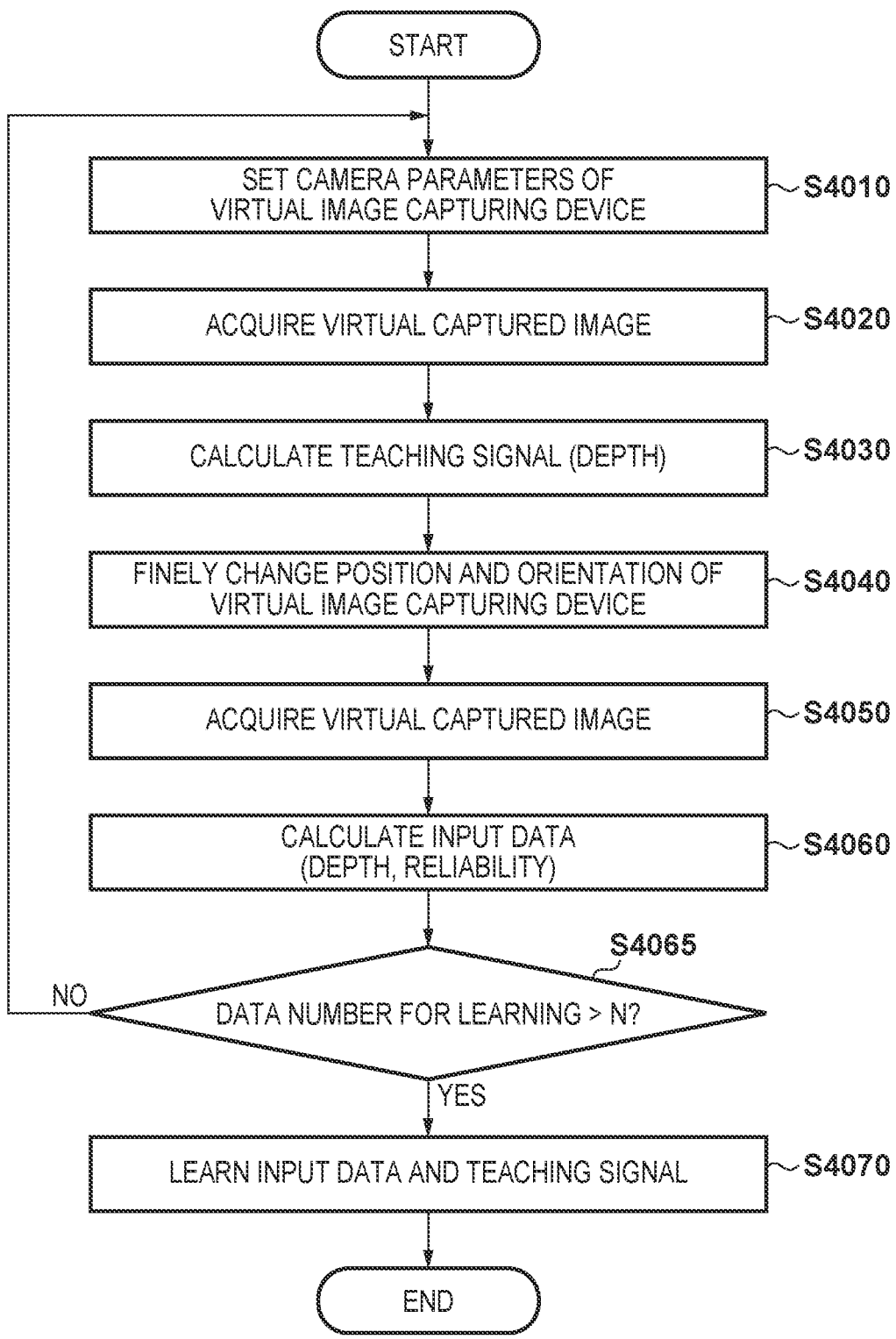
FIG. 12 is a flowchart of processing of the information processing apparatus according to the first modification.

Machine learning data generation processing by the control unit 1500 according to the first modification will be described with reference to the flowchart of FIG. 12.

In step S4010, the control unit 1500 sets camera parameters of each image capturing device in a plurality of virtual spaces. In step S4020, the control unit 1500 acquires each captured image displaying a virtual model of the object. In step S4030, the control unit 1500 acquires, in the same manner as the embodiment described above, corresponding points between the captured images of the plurality of image capturing devices acquired in step S4020, and calculates an error-free teaching signal (depth) by stereo measurement.

In step S4040, upon assuming that aging of devices and changes due to temperature have occurred, the control unit 1500 finely changes the position and the orientation of a virtual image capturing device. However, the calculation parameters to be used for stereo measurement of the virtual image capturing device are not changed. In step S4050, the control unit 1500 acquires (generates) a captured image of the finely changed virtual image capturing device.

Figure 13:
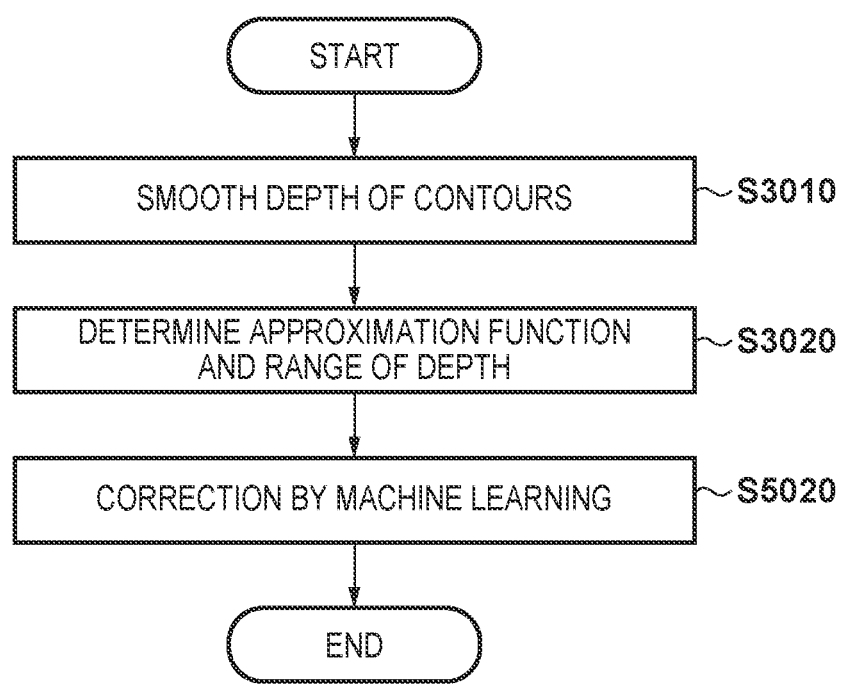
FIG. 13 is a flowchart of processing of the information processing apparatus according to the first modification.

In step S4060, the control unit 1500 calculates the input data (the depth and the reliability) from the captured image acquired in step S4050 and the camera parameters set in step S4010. In step S4065, the control unit determines whether sufficient data has been generated by comparing the number of data with a threshold N. After sufficient data have been generated, the control unit 1500 executes, in step S4070, machine learning by using the generated input data and the teaching signal. For example, learning is performed so that the teaching signals of the contour positions 1 to 10 will be acquired when input data sets of the contour positions 1 to 10 are input. Note that since the length of the contour to be corrected changes depending on the shape and the position of the object, the maximum to minimum range of the depth and that of the length of the contour to be corrected may be made identical to each other by normalization during learning. After the learning ends, depth correction is executed by using the learning result. FIG. 13 shows the procedure of depth correction of each corresponding point according to the first modification.

First, in a similar manner to the embodiment described above, the control unit 1500 acquires the approximation range of the approximation function in steps S3010 and S3020. Note that in this modification, the approximation function used in step S3020 is automatically determined by the machine learning regression model. In step S5020, the control unit 1500 corrects the depth of the correction range by using the inference result.

[Second Modification]

Although the approximation range of the approximation function is acquired and each depth within the range is estimated based on the input data that falls within the range in the first modification described above, the approximation range need not always be determined. For example, the depth of a corresponding point of interest may be corrected based on the reliabilities and the depths of a plurality of corresponding points near an arbitrary corresponding point.

Figure 14:
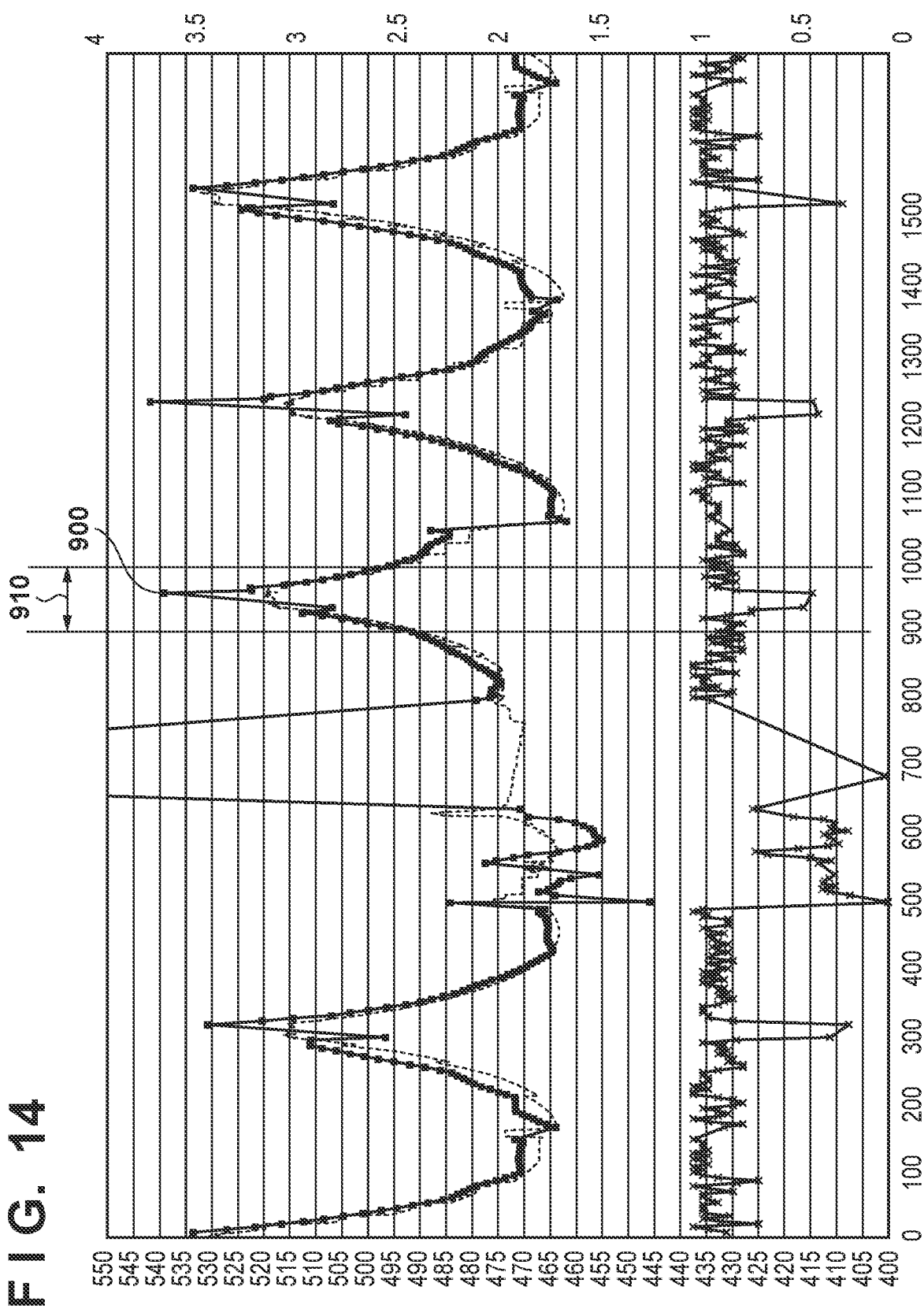
FIG. 14 is a graph for explaining correction processing according to the second modification.

More specifically, as shown in FIG. 14, a corresponding point 900 may be set as a corresponding point of interest, and the depth of the corresponding point 900 may be corrected from the reliability and the depth of each of approximately fifty corresponding points 910 with respect to a preset range, for example, the corresponding point as the center. In a similar manner, the correction processing can be performed on all of the corresponding points to perform depth correction without acquiring the approximation range.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-163624, filed Aug. 31, 2018 which is hereby incorporated by reference herein in its entirety.

What is claimed is:

1. An information processing apparatus comprising:
an image acquiring unit configured to acquire images captured by a plurality of image capturing devices;
a contour extracting unit configured to extract a contour of an object from each of the acquired images;
a detection unit configured to detect a set of corresponding points representing an identical three dimensional position from the images by using the contour extracted from each of the images and an epipolar line going through the images;
a depth estimating unit configured to estimate a depth of the three dimensional position represented by the set of corresponding points;
a calculation unit configured to calculate an angle formed by the epipolar line and a tangential direction of the contour; and
a depth correcting unit configured to correct the estimated depth based on the calculated angle,
wherein the depth correcting unit calculates a reliability based on the calculated angle and corrects the estimated depth based on the calculated reliability.

2. The apparatus according to claim 1, wherein the depth correcting unit learns the contour, a change in the depth, and the reliability by machine learning and corrects the estimated depth by using a result of the learning.

3. The apparatus according to claim 1, wherein the depth correcting unit learns by machine learning reliabilities and depths of a plurality of neighboring positions with respect to a position of interest and corrects a depth of the position of interest.

4. The apparatus according to claim 2, wherein letting $\theta$ be the angle formed by the epipolar line and the tangential direction of the contour, the reliability is expressed by $$1 - |\cos \theta|.$$

5. The apparatus according to claim 2, wherein the reliability is determined based on a difference between the angle formed by the epipolar line and the tangential direction of the contour of each of the plurality of image capturing devices.

6. The apparatus according to claim 2, wherein letting $\theta$ be the angle formed by the epipolar line and the tangential direction of the contour and $\varphi$ be a difference between the angle formed by the epipolar line and the tangential direction of the contour of each of the plurality of image capturing devices, the reliability is expressed by $$(1 - |\cos \theta|) \cdot \cos \varphi.$$

7. The apparatus according to claim 1, wherein the depth correcting unit corrects the depth by an error function using a least squares method.

8. A method of controlling an information processing apparatus, the method comprising:
acquiring images captured by a plurality of image capturing devices;
extracting a contour of an object from each of the acquired images;
detecting a set of corresponding points representing an identical three dimensional position from the images by using the contour extracted from each of the images and an epipolar line going through the images;
estimating a depth of the three dimensional position represented by the set of corresponding points;
calculating an angle formed by the epipolar line and a tangential direction of the contour; and
correcting the estimated depth based on the calculated angle,
wherein a reliability is calculated based on the calculated angle and the estimated depth is corrected based on the calculated reliability.

9. A non-transitory computer-readable storage medium storing a program which causes, when read and executed by a computer, the computer to perform the steps of a method, the method comprising:
acquiring images captured by a plurality of image capturing devices;
extracting a contour of an object from each of the acquired images;
detecting a set of corresponding points representing an identical three dimensional position from the images by using the contour extracted from each of the images and an epipolar line going through the images;
estimating a depth of the three dimensional position represented by the set of corresponding points;
calculating an angle formed by the epipolar line and a tangential direction of the contour; and
correcting the estimated depth based on the calculated angle,
wherein a reliability is calculated based on the calculated angle and the estimated depth is corrected based on the calculated reliability.

* * * * *